United States Patent Office 3,446,476
Patented May 27, 1969

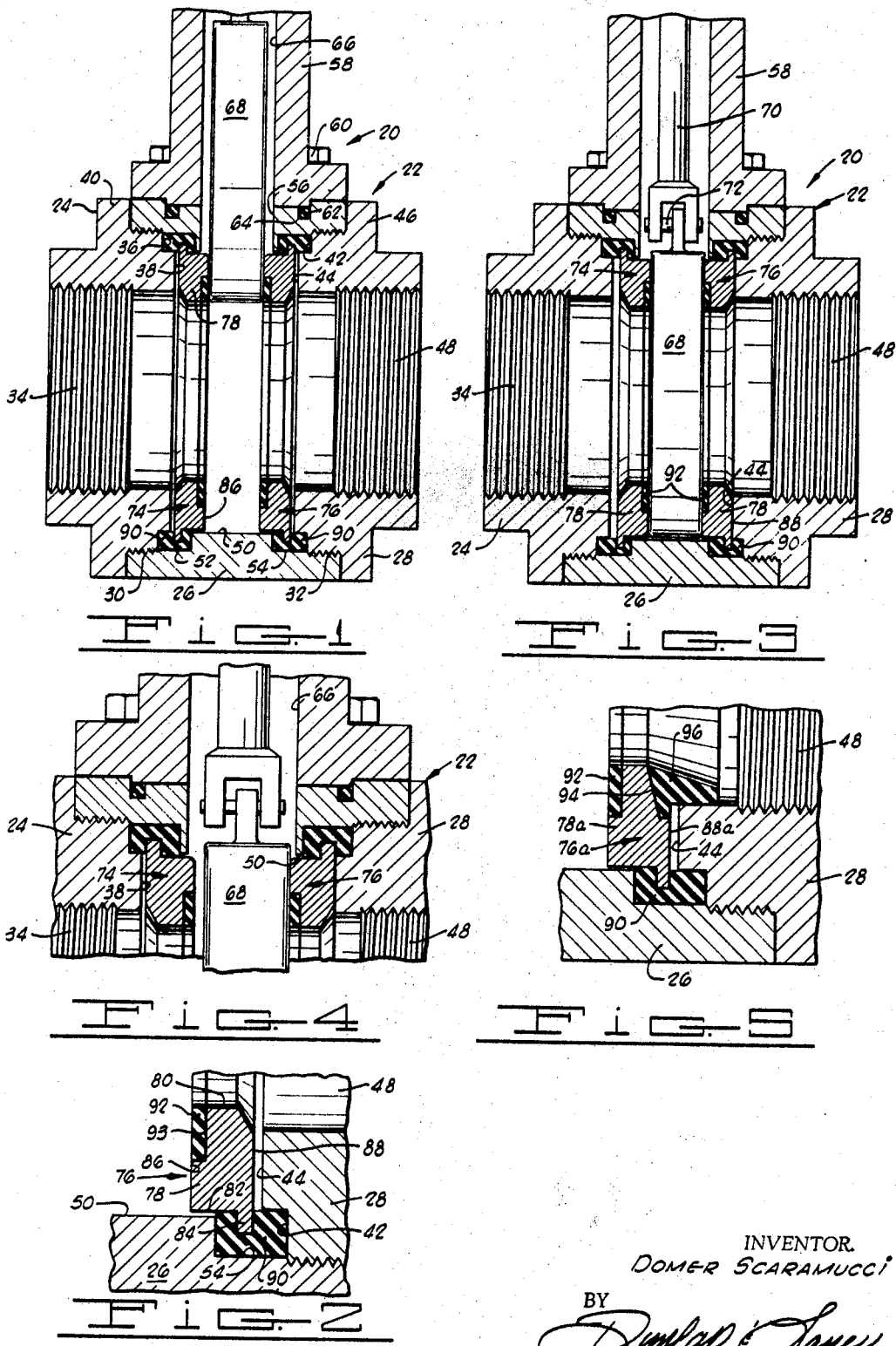

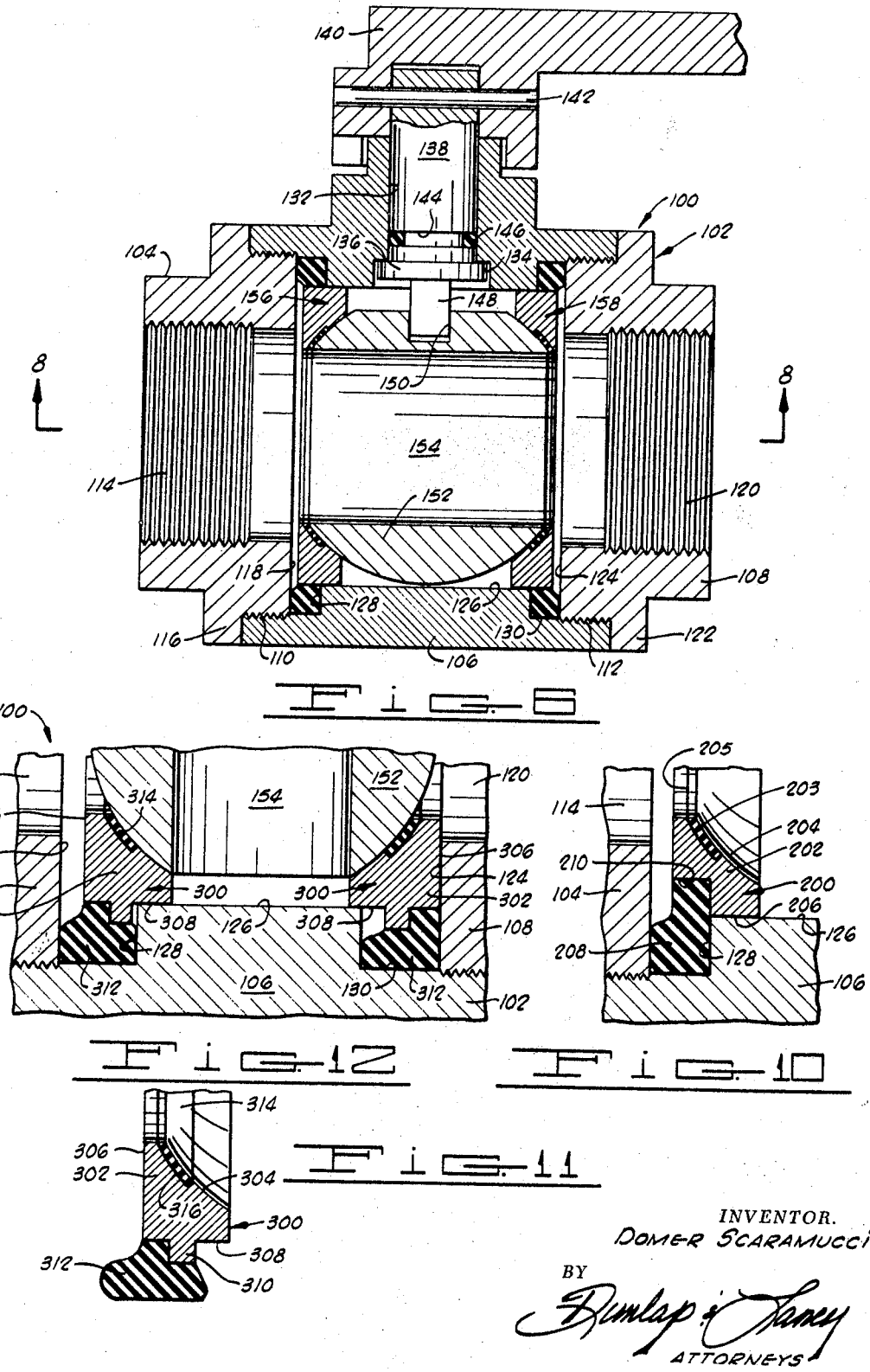

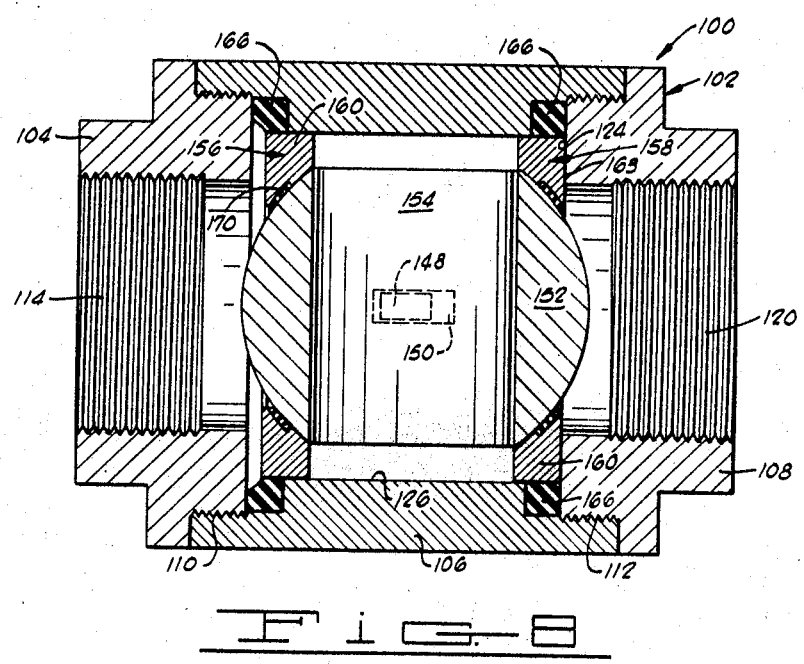

3,446,476
VALVES WITH MOVABLE SEALS
Domer Scaramucci, Oklahoma City, Okla., assignor to Balon Corporation, Oklahoma City, Okla., a corporation of Oklahoma
Filed May 12, 1965, Ser. No. 455,202
Int. Cl. F16k 25/00
U.S. Cl. 251—172     5 Claims

ABSTRACT OF THE DISCLOSURE

A valve structure having a floating valve member and upstream and downstream seals. Each seal includes a seating ring elastically held on the respective side of the valve member by a sealing ring bonded to the outer periphery of the seating ring and clamped between the end of the valve body and an end connector. Each seating ring also has an elastic seal member near the inner periphery thereof engaging the valve member in order to expose the major portion of the inner end of the seating ring to the pressure in the valve body, whereby excessive body pressure will move the upstream seating ring away from the valve member and bleed the excessive pressure into the upstream end of the valve.

---

This invention relates generally to improved valves. More particularly, but not by way of limitation, this invention relates to improved valves having movable seals located therein.

It is highly desirable in the valve art to be able to construct a valve that provides a fluid tight seal when in the closed position of the valve, that is, to construct a valve that provides a complete shut off when the valve is closed. Also, it is highly desirable that such valve incorporate means for releasing any pressure that may be trapped within the valve body during closure of the valve. Naturally, it is also highly desirable that the valve be constructed in the most economical manner possible whereby the valve will be competitive with valves presently available. In addition to the foregoing features, the valve should also be able to provide a fluid tight shut off when installed in a system that is used with either low or high pressure fluids.

The use of valves incorporating a valve member that is movable relatively along the flow passageway through the valve that is, a floating valve member, has become more prevalent. When the floating valve member is used, the seals in the valve must be constructed so that they will flex, deform, or move sufficiently to permit the movement of the valve member. Seals constructed from material that is sufficiently soft to permit deformation to accommodate the movement have not been found to be entirely satisfactory when used in relatively high pressure service. Therefore, it has been necessary to provide a rigid reinforcing member in the seal to support the relatively soft seal material to withstand the high fluid pressure.

Seals incorporating rigid reinforcing material have been relatively expensive thereby increasing the cost of manufacturing the valves. Also, it has been necessary to provide additional seal members to prevent the escape of fluid from the valve body through the connections between the end portions and valve body. The separate end portions are provided to connect the valve with the system in which it is to be used and to permit assembly of the valve.

This invention contemplates a valve construction wherein the valve body includes an inlet portion having an inlet opening extending therethrough, a outlet portion having an outlet opening extending therethrough, and a medial portion having an enlarged opening extendig therethrough with a counterbore in at least one end of the medial portion. When assembled, the openings through the inlet, outlet and medial portions form a flow passageway through the valve body. A movable valve member is disposed in the medial portion and is movable therein from a position opening the passageway to a position closing the passageway. In accordance with this invention, a valve seal is disposed in the counterbore and includes a relatively rigid seating ring having a surface disposed adjacent the valve member and adapted to form a seal therewith, an inner periphery encircling the flow passageway, and an outer periphery that is sized to be slidingly received in the enlarged opening in the medial portion of the valve body. The seal also includes a resilient sealing ring bonded to the outer periphery of the seating ring and located in the counterbore in sealing engagement with the medial portion and the adjacent inlet or outlet portion. The arrangement of the resilient sealing ring is such that it cooperates with the valve body to form a seal therein and has sufficient mass to permit the seating ring to move along the flow passageway in a valve body as the valve member moves therein.

One object of the invention is to provide an improved valve that may be easily and economically manufactured.

Another object of the invention is to provide an improved valve that may be easily and simply repaired in a minimum of time.

A further object of the invention is to provide an improved valve that provides a complete shut off when closed and incorporates means for releasing pressure that would otherwise be trapped in the valve body.

Still another object of the invention is to provide an improved seal for use in valves that can be quickly and easily manufactured.

A still further object of the invention is to provide an improved seal for use in a valve that prevents the escape of fluid from the interior to the exterior of the valve through the threads joining the end portions with the valve body.

One other object of the invention is to provide an improved valve incorporating a seal therein that is movably disposed in the valve body and yet forms a fluid tight seal therein without the use of additional seal members.

The foregoing and additional objects and advantages of the invention will become more apparent as the following detailed description is read in conjunction with the accompanying drawings wherein like reference characters denote like parts in all views and wherein;

FIG. 1 is a vertical cross-sectional view of a gate valve constructed in accordance with the invention;

FIG. 2 is an enlarged fragmentary cross-sectional view of the valve of FIG. 1 showing one of the seals therein;

FIG. 3 is a view similar to FIG. 1, but illustrating the gate valve in another operating position;

FIG. 4 is an enlarged fragmentary cross-sectional view of a portion of the gate valve of FIG. 1 in still another operating position;

FIG. 5 is an enlarged fragmentary cross-sectional view illustrating a modified seal for use in the gate valve of FIG. 1;

FIG. 6 is a vertical cross-sectional view of a ball valve also constructed in accordance with the invention;

FIG. 7 is an enlarged cross-sectional view of one of the seals utilized in the ball valve of FIG. 6;

FIG. 8 is a horizontal cross-sectional view of the ball valve of FIG. 6, taken substantially along the line 8—8 of FIG. 6;

FIG. 9 is an enlarged fragmentary cross-sectional view of the ball valve of FIG. 6 illustrating the valve in another operating position;

FIG. 10 is an enlarged fragmentary cross-sectional view illustrating another embodiment of seal also constructed in accordance with the invention;

FIG. 11 is an enlarged cross-sectional view of another embodiment of seal also constructed in accordance with the invention; and, FIG. 12 is an enlarged fragmentary cross-sectional view of a ball valve incorporating the seal illustrated in FIG. 11.

Embodiment of FIG. 1

Referring to the drawing and to FIG. 1 in particular, shown therein and generally designated by the reference character 20 is a gate valve constructed in accordance with the invention. The gate valve 20 includes a valve body 22 having an inlet portion or connecting member 24, a medial portion of body member 26, and an outlet portion or connecting member 28. The inlet portion 24 is threadedly connected to the medial portion 26 by threads 30 and the outlet portion 28 is threadedly connected to the medial portion 26 by threads 32.

The inlet portion 24 includes a partially threaded inlet opening 34, an annular recess 36 encircling an end surface 38, and an exterior flange 40 arranged to abut one end of the medial portion 26 to position the end surface 38 of the inlet portion 24 in the medial portion 26.

The outlet portion 28 is provided with an annular recess 42 that encircles an end surface 44 and an exterior flange 46 that is arranged to abut the opposite end of the medial portion 26 to position the end surface 44 and the annular recess 42 in the medial portion 26. The outlet portion 28 also includes a partially threaded outlet opening 48 extending therethrough.

The medial portion 26 includes an opening 50 that is enlarged relative to the size of the inlet and outlet openings 34 and 48, respectively. A counterbore 52 is provided in the interior of the medial portion 26 adjacent the annular recess 36 in the inlet portion 24. A second counterbore 54 is provided in the medial portion 26 adjacent the annular recess 42 in the outlet portion 28. The medial portion 26 also includes a transverse opening 56 that extends through one side thereof for purposes that will become more apparent hereinafter. The openings 34, 48 and 50 define a flow passageway extending through the valve body 22.

An extension member 58 is attached to the medial portion 26 by a plurality of threaded fasteners 60. An O-ring 62 is disposed in a recess 64 in the medial portion 26 that encircles the opening 56. The O-ring 62 sealingly engages the medial portion 26 and extension member 58.

An interior 66 of the extension member 58 is in register with the opening 56 in the medial portion 26. The opening 56 and interior 66 are sized to receive a valve gate member 68. As may be seen in FIG. 3, the upper end of the valve gate member 68 is movably connected to the lower end of an operating rod 70 by a pin 72 so that the gate member 68 can move along the flow passageway in the valve body 22. The operating rod 70 extends upwardly through the extension member 58 into threaded engagement with a valve operating member (not shown) as is well known to those skilled in the gate valve art.

An upstream seal 74 is disposed in the valve body 22 between the inlet portion 24 and the valve gate member 68. An identical though oppositely disposed downstream seal 76 is located in the valve body 22 between the outlet portion 28 and the valve gate member 68. Since the seals 74 and 76 are identical in construction, only the downstream seal 76 will be described in detail.

FIG. 2 illustrates the structure of the downstream seal 76 in enlarged detail and will be referred to for the purpose of describing the seals. As shown therein, the seal 76 includes a seating ring 78 constructed from a relatively rigid material.

The seating ring 78 includes an inner periphery 80 that is disposed adjacent the flow passageway extending through the gate valve 20 and an outer periphery 82 that is sized to be slidingly received in the enlarged opening 50 in the medial portion 26. An exterior flange 84 encircles the outer periphery 82 of the downstream seal 76 extending into the second counterbore 54 provided in the medial portion 26. The seating ring 78 also includes a surface 86 that is disposed adjacent the valve gate member 68 as illustrated in FIG. 3 and a surface 88 that is disposed adjacent the end surface 44 of the outlet portion 28.

The downstream seal 76 also includes a sealing ring 90 that is bonded to the outer periphery 82 of the seating ring 78 and to the exterior flange 84 thereon. The sealing ring 90 is constructed sufficiently large so that it sealingly engages the medial portion 26 and the outlet portion 28 (or inlet portion 24) in the annular recess 42 (or 36) to movably retain the seating ring 78 in the valve body 22. That is, the sealing ring 90 is longer in a direction parallel to the flow passageway through the valve 20 than the depth of the combined recesses 36 and 42 so that the sealing ring 90 is deformed upon assembly of the inlet and outlet portions 24 and 28, respectively, thereby forming a fluid-tight seal between the portions 24 and 28 and the medial portion 26. It should be pointed out that the material used for forming the sealing ring 90 should be sufficiently elastic and resilient to permit sliding movement of the seating ring 78 in the enlarged opening 50 in the valve body 22.

To assure a fluid-tight seal between the downstream seal 76 and the valve gate member 68 when the valve gate member 68 is in the position shown in FIG. 3, an elastic annular seal member 92 is bonded in an annular recess 93 formed in the surface of the seating ring 78.

Operation of the embodiment of FIG. 1

As illustrated in FIG. 1, the valve 20 is in the open position, that is, the valve gate member 68 is raised in the interior 66 of the extension member 58 until the flow passageway through the valve 20 is unobstructed. With the valve gate member 68 in this position, it can be perceived that the surfaces 86 on the seating rings 78 of the upstream and downstream seals 74 and 76, respectively, are urged by the resiliency of the sealing rings 90 into engagement with the lower end of the valve gate member 68 to center the valve gate member 68 in the valve body 22.

To close the valve 20, the valve operating member (not shown) is rotated to move the valve gate member 68 and the operating rod 70 downwardly until the valve gate member 68 is in the position illustrated in FIG. 3. As shown therein, the valve gate member 68 is in a position closing the flow passageway extending through the valve body 22. It can also be perceived in FIG. 3 that the valve gate member 68 has been shifted toward the outlet opening 48 by fluid pressure in the inlet opening 34.

If the pressure is sufficiently high, the valve gate member 68 moves the seating ring 78 of the downstream seal 76 until the surface 88 thereon engages the end surface 44 of the outlet portion 28. Such movement deforms the sealing ring 90 and is possible due to the resiliency and relatively large mass of the sealing ring 90 as previously described. It should be pointed out that, even when deformed, the sealing ring 90 remains in sealing engagement with the valve body 22. It can also be noted in FIG. 3, that the valve gate member 68 is in sealing engagement with the elastic annular seal member 92 thereby forming a fluid tight downstream seal in the gate valve 20.

The sealing ring 78 of the upstream seal 74, due to the fluid pressure in the inlet opening 34, shifts toward the outlet opening 48 maintaining its engagement with the valve gate member 68 and maintaining the elastic annular seal member 92 on the upstream seal 74 in fluid-tight engagement with the valve gate member 68, thereby forming an effective upstream seal in the valve 20. Thus, the upstream and downstream seals 74 and 76, respectively, cooperate with the valve gate member 68 to form both upstream and downstream seals in the valve 20 when the valve gate member 68 is in the closed position.

The sealing arrangement described also has the advantage of permitting the escape of fluid that may be trapped in the space between the seals 74 and 76, that is, permiting fluid trapped in the opening 50 and interior 66 of the extension member 58 to escape. As shown in FIG. 4, the pressure in the openings 50 and 66 has increased until it is higher than the pressure in the inlet opening 34. It can be perceived therein that the downstream seal 76 remains in sealing engagement with the valve gate member 68 and in engagement with the outlet portion 28. Also, the pressure in the outlet opening 48 is less than the inlet pressure and, therefore, is not sufficient to move the valve gate member 68 and the upstream seal 74 toward the inlet portion 24. Under these conditions, fluid trapped in the interior 66 and in the opening 50 exerts a force on the upstream seal 74 moving it slightly to the left and away from the valve gate member 68 so that the trapped fluid can escape therebetween into the inlet opening 34. Thus, it can be seen that the valve 20 includes seal structure having the ability to provide both upstream and downstream seals and to release any pressure that may build up within the valve body 22.

Manifestly, the direction of fluid pressure described hereinbefore is purely arbitrary and it should be understood that the seals 74 and 76 function equally well regardless of the direction in which pressure is applied in the gate valve 20.

*Embodiment of FIG. 5*

FIG. 5 illustrates a modification of the seals 74 and 76 and is generally designated by the reference character 76a. As shown therein, the seal 76a is similar to the seals 74 and 76 in including the sealing ring 90 and the elastic annular seal member 92 located thereon as described in connection with the seals 74 and 76.

The seal 76a includes a seating ring 78a that has an annular recess 94 formed in a surface 88a that is positioned adjacent the end surface 44 of the outlet portion 28 as was the surface 88 of the seating ring 78. A resilient annular member 96 is disposed in the annular recess 94 and is bonded to the seating ring 78a therein. The resilient annular member 96 extends substantially coaxially with the passageway through the valve body 22, overlying a portion of the outlet portion 28 to prevent the entrance of deleterious materials into the space between the surfaces 88a and the end surface 44. Functionally the seal 78a operates in the same manner as did the seals 74 and 76.

*Embodiment of FIG. 6*

FIG. 6 illustrates a ball valve constructed in accordance with the invention and generally designated by the reference character 100. The ball valve 100 includes a valve body 102 having an inlet portion or connecting member 104, a medial portion or body member 106, and an outlet portion or connecting member 108. The inlet portion 104 is connected to the medial portion 106 by threads 110. The outlet portion 108 is connected to the medial portion 106 by threads 112.

The inlet portion 104 includes a partially threaded inlet opening 114 and a peripherial flange 116 that is arranged to engage one end of the medial portion 106 to position an end surface 118 on the inlet portion 104 in the valve body 102.

The outlet portion 108 includes a partially threaded outlet opening 120 and a peripherial flange 122 that is adapted to engage the other end of the medial portion 106 to position an end surface 124 on the outlet portion 108 in the valve body 102.

The medial portion 106 includes an enlarged opening 126 extending therethrough that is relatively large as compared to the inlet and outlet openings 114 and 120, respectively. A counterbore 128 is formed in the medial portion 106 adjacent the end surface 118 of the inlet portion 104 and a counterbore 130 is formed in the medial portion 106 adjacent the end surface 124 of the outlet portion 108. A transverse opening 132 extends through the medial portion 106 into the enlarged opening 126 therein. The end of the transverse opening 132 adjacent the enlarged opening 126 is spot-faced, forming a downwardly facing surface 134 that engages an exterior flange 136 on a valve operating member 138 to limit the upward movement of the valve operating member 138 relative to the valve body 102.

The valve operating member 138 extends through the transverse opening 132 and has its upper end connected to an operating handle 140 by a pin 142. The valve operating member 138 includes an annular groove 144 that is sized to receive an O-ring seal 146. The O-ring seal 146 forms a fluid-tight seal between the valve operating member 138 and the medial portion 106 within the transverse opening 132 to prevent the escape of fluid from the interior of the valve body 102.

A rectangular lower end 148 of the valve operating member 138 extends downwardly into a rectangular recess 150 formed in the surface of a valve ball 152 that is positioned in the valve body 102. As may be seen more clearly in FIG. 8, the rectangular lower end 148 (shown in dash lines) is considerably smaller in one dimension than the rectangular recess 150 (shown in dash lines) in the valve ball 152 for purposes that will become more apparent hereinafter.

In addition to the rectangular recess 150, the valve ball 152 also includes a passageway 154 extending therethrough. The passageway 154 cooperates with the inlet opening 114 and the outlet opening 120 to form a flow passageway through the ball valve 100.

An annular upstream seal 156 is disposed in the enlarged opening 126 between the valve body 102 and the valve ball 152 and encircling the inlet opening 114. An identical but oppositely disposed annular downstream seal 158 is located in the enlarged opening 126 between the valve body 102 and the valve ball 152 and encircling the outlet opening 120.

As shown most clearly in FIG. 7, the seal 156 includes a seating ring 160 having an outer periphery 162 that is sized to be slidingly received within the enlarged opening 126 in the medial portion 106 (see FIG. 6). The seating ring 160 has a surface 163 disposed adjacent the end surface 118 of the inlet portion 104 and a surface 164 disposed adjacent the valve ball 152 and configured to conform to the exterior surface of the valve ball 152.

Each of the seals 156 and 158 also include a sealing ring 166 that is bonded to the outer periphery 162 of the seating ring 160. The sealing rings 166 are constructed from a resilient material, such as natural or synthetic rubber, and have a sufficiently large outer peripheral portion to sealingly engage the medial portion 106 and the adjacent end surface 118 or 124 of the respective inlet or outlet portions 104 or 108. The reference character 168 in FIG. 7 illustrates the width of the counterbores 128 and 130. From this, it can be seen that the sealing ring 166, when the medial portion 106 is assembled with the inlet and outlet portions 104 and 108, will be deformed and will, therefore, be in fluid-tight sealing engagement with the valve body 102.

An elastic annular seal member 170 is disposed in an annular groove 172 formed in the surface 164 of the seating ring 160 adjacent the inner periphery thereof. The elastic annular seal member 170 is arranged to sealingly engage the exterior surface of the valve ball 152.

*Operation of the embodiment of FIG. 6*

As illustrated in FIG. 6, the ball valve 100 is illustrated as being in the open or full flow position, that is, with the valve ball 152 rotated to a position wherein the passageway 152 in the valve ball 152 is in alignment with the inlet opening 114 and the outlet opening 120.

To close the ball valve 100, the operating handle 140 is rotated approximately ninety degrees (90°), rotating the valve operating member 138 and, by virtue of the rectangular lower end 148 thereon, also rotating the ball valve 152. When the valve 100 is in the closed position, the valve ball 152 will be disposed as illustrated in FIG. 8, that is, with the passageway 154 in the valve ball 152 arranged substantially perpendicularly to the inlet opening 114 and outlet opening 120.

Fluid pressure in the inlet opening 114 exerts a force on the valve ball 152 to move it relatively toward the outlet opening 120. Movement of the valve ball 152 in this direction moves the seating ring 160 of the downstream seal 158 until the surface 163 thereon engages the end surface 124 of the outlet portion 108. Such movement is possible due to the mass and flexibility of the sealing ring 166. It can be appreciated that the downstream seal 158 supports the valve ball 152 and forms a fluid tight downstream seal therewith when the seating ring 160 is in engagement with the outlet portion 108.

The seating ring 160 of the annular upstream seal 156 also moves with the valve ball 152 remaining in sealing engagement therewith due to the influence of fluid pressure in the inlet opening 114. The movement of the upstream seal 156 is possible due to the mass and resiliency of the sealing ring 166 thereon. As may be seen in FIG. 8, the seating ring 160 and the elastic annular seal member 170 remain in engagement with the valve ball 152 in its shifted position to form a fluid-tight upstream seal therewith. Thus, it can be appreciated that the seal arrangement described provides both a fluid-tight upstream and a fluid-tight downstream seal resulting in the complete closure of the valve 100.

It should be pointed out that the downstream movement of the valve ball 152 is possible since the rectangular recess 150 in the valve ball 152 is considerably longer than the rectangular lower end 148 of the valve operating member 138. The relative positions of the rectangular lower end 148 and the rectangular recess 150 are clearly illustrated in dash lines in FIG. 8.

Referring to FIG. 9, the valve ball 152 is illustrated in the position it occupies when the pressure in the opening 126 has increased until it is in excess of the pressure in the inlet opening 114. As shown therein, the valve ball 152 remains in its downstream position, that is, shifted into engagement with the downstream seal 158 that is also in engagement with the outlet portion 108 as previously described. The annular upstream seal 156 has been displaced relatively toward the end surface 118 of the inlet portion 104 due to the influence of pressure trapped in the enlarged opening 126. As can be perceived therein, the elastic annular seal member 170 on the upstream seal 156 is out of engagement with the surface of the valve ball 152, thereby permitting fluid flow from the enlarged opening 126 between the surface of the valve ball 152 and the surface 164 on the annular upstream seal 156 into the inlet opening 114.

While the operation of the valve ball 100 has been explained assuming that pressure is applied to the valve 100 through the inlet opening 114, it should be understood that the valve 100 will operate equally well regardless of the direction in which the fluid pressure is applied. Also, it should be pointed out that no fluid can escape from the enlarged opening 126 through the threads 110 or the threads 112 due to the sealing engagement of the sealing rings 166 with the medial portion 106 in the inlet portion 104 and outlet portion 108. Fluid cannot escape from the enlarged opening 126 into the outlet opening 120 between the seating ring 160 and the sealing ring 166 of the downstream seal 158 due to the bond formed therebetween even though the seating ring 160 thereon is slidable in the enlarged opening 126 to permit movement of the seating ring 160 of the downstream seal 158 with the movement of the valve ball 152.

Embodiment of FIG. 10

FIG. 10 illustrates another embodiment of movable seal generally designated by the reference character 200 and also constructed in accordance with the invention. It should be understood that the seal 200 can be used in the ball valve 100 replacing either or both of the annular upstream seal 156 and the annular downstream seal 158. As shown in FIG. 10, the seal 200 includes a seating ring 202 having a surface 204 configurated to conform to the exterior of the valve ball 152. An elastic annular seal 203 is located in an annular recess 205 in the surface 204. The seal 203 is provided to engage the valve ball 152 and form a fluid-tight seal therewith. An outer periphery 206 of the seating ring 202 is sized to be slidingly received in the enlarged opening 126 in the medial portion 106.

A sealing ring 208 is constructed from a resilient material, such as natural or synthetic rubber, and is disposed in the counterbore 128 in the medial portion 106. The sealing ring 208 is sized to sealingly engage the inlet portion 104 and the medial portion 106 as did the sealing ring 166 of the valve of FIG. 6. In the seal 200, the sealing ring 208 extends into a recess 210 formed in the outer periphery 206 of the seating ring 202 and is bonded therein. As can be perceived by comparing FIG. 10 with FIGS. 6, 8 and 9, the function and operation of the seal 200 is the same as the seals 156 and 158 described therein.

Embodiment of FIG. 11

FIGS. 11 and 12 illustrate another embodiment of movable seal generally designated by the reference character 300 and also constructed in accordance with the invention. As shown in FIG. 11, the seal 300 includes a seating ring 302 having a surface 304 configured to conform to the exterior of the valve ball 152 (see FIG. 12). The seating ring 302 also includes a surface 306 that is substantially opposed to the surface 304 and is arranged to abut the end surface 124 of the outlet portion 108 or the end surface 118 of the inlet portion 104 as will be described. An outer periphery 308 on the seating ring 302 is sized to be slidingly received within the enlarged opening 126 of the medial portion as 106 as shown in FIG. 12. A peripherial flange 310 extends around the outer periphery 308 and into the counterbores 128 and/or 130 of the medial portion 106 also as shown in FIG. 12.

A sealing ring 312 that is constructed from a resilient material, such as natural or synthetic rubber, is bonded to the outer periphery 308 of the seating ring 302 and to a portion of the peripherial flange 310 thereon. The sealing rings 312 are disposed in the counterbores 128 and 130 as shown in FIG. 12 when assembled in the valve 100 and are sized to sealingly engage the valve body 102 therein.

An elastic annular seal member 314 is disposed in a recess 316 formed in the surface 304 of the seating ring 302. The elastic annular seal member 314 is arranged to sealingly engage the exterior surface of the valve ball 152 as will be described.

As shown in FIG. 12, the seals 300 are used in lieu of the seals 156 and 158 illustrated in FIG. 6. As shown therein, the valve ball 152 has been displaced toward the outlet opening 120 under the influence of pressure in the inlet opening 114. The seating ring 302 of the seal 300 on the downstream side of the ball valve 100 is moved by the valve ball 152 until the surface 306 thereon is in engagement with the end surface 124 of the outlet portion 108. The movement of the seating ring 302 is possible due to the mass and resiliency of the sealing ring 312 which, although deformed, retains its sealing engagement with the valve body 102.

Similarly, the seating ring 302 of the seal 300 on the upstream side of the ball valve 100 follows the valve ball 152 due to the pressure in the inlet opening 114 maintaining the elastic annular seal member 314 thereon in sealing engagement with the exterior surface of the valve ball 152. Again, such movement is possible due to the deformation of the sealing ring 312 which maintains its sealing engagement with the valve body 102. Thus, it can be seen that the seals 300 when used in the ball valve 100 in lieu of the seals 156 and 158 are effective to form both upstream and downstream seals with the valve ball 102 affording a complete closure of the valve.

Although not illustrated, the seals 300 will function to relieve pressure within the enlarged opening 126 as described in connection with the seals 156 and 158. Also, the direction of application of pressure to the ball valve 100 incorporating the seals 300 is immaterial since the seals 300 operate equally well when pressure is applied either in the inlet opening 114 or in the outlet opening 120.

It should also be pointed out that all the seal forms described in connection with the ball valve 100 may be applied equally well in a gate valve such as illustrated in FIG. 1. For such application, each of the seals described in FIGS. 6 through 12 must be modified so that the surface thereon adjacent the valve member is suitable for operation with a valve gate member instead of the valve ball as illustrated.

Each of the seals described, functions with a movable valve member to form an initial fluid-tight seal therewith due to the resiliency of the sealing ring attached to the seating ring. When the valve member moves relatively downstream in response to the fluid pressure in the inlet the engagement of the seating ring with the outlet portion of the valve body provides a structurally strong support for the valve to enable the valve to maintain its closure even when used with relatively high pressures.

Furthermore, the resiliency of the sealing rings, which are bonded to the seating rings, biases the valve member toward a centered position when there is no pressure or very little pressure acting on the valve member. Thus, it can be seen that seals constructed in accordance with the invention operate to form fluid-tight upstream and downstream seals with the valve member regardless of whether the valve is to be used in relatively low or relatively high pressure service.

What I claim is:
1. A valve comprising:
a valve body member having an enlarged opening extending therethrough with a counterbore in each end of the enlarged opening and internal threads in each counterbore extending from the respective end of the body member through a portion of the length of the respective counterbore;
a tubular connector secured in each end of the body member enlarged opening to cooperate with said enlarged opening in forming a flow passageway through the valve, each of said connectors being threaded into the respective counterbore and having an external flange thereon arranged to engage the respective end of the body member and limit the movement of the connector into the respective counterbore, whereby a space is provided between the bottom of each counterbore and the adjacent end of the respective connector;
a floating valve member disposed in the body member, the valve member being moveable from a position closing the flow passageway to a position wherein the passageway is opened; and,
a valve seal disposed in the enlarged opening on each side of the valve member, each of said seals including:
a rigid material seating ring having a surface disposed adjacent the valve member, an inner periphery, an outer periphery, said outer periphery being sized to be slidingly received in the enlarged opening in the valve body member;
an elastic sealing ring bonded on the outer periphery of said seating ring and located in the respective counterbore, said sealing ring being longer in a direction parallel to the passageway than the space between the respective connector and the bottom of the respective counterbore, whereby said sealing ring is deformed into fluid-tight sealing engagement with the valve body member and the respective connector when the valve body member and connectors are assembled and supports the respective seating ring for limited axial movement in the valve body; and
an annular, elastic material seal member bonded to the surface of the seating ring adjacent the valve member in a position to engage and seal against the valve member, said seal member being positioned nearer to the inner periphery than the outer periphery of the seating ring to expose the major portion of the surface of the seating ring adjacent the valve member to the pressure of fluid in said enlarged opening between said seals when the valve is closed, whereby the upstream seating ring will move upstream away from the valve member and relieve excessive pressure in the valve body.

2. A valve as defined in claim 1 wherein each seating ring also includes a radially extending flange on the outer periphery thereof and said sealing ring has an annular groove therein sized to receive said flange.

3. A valve as defined in claim 1 wherein each of said seating rings has an annular recess in the outer periphery thereof and said sealing ring is bonded to said seating ring in the annular recess.

4. A valve as defined in claim 1 characterized further to include:
an annular elastic member bonded to each of said seating rings on a surface generally opposite to the surface adjacent the valve member, said annular elastic member projecting coaxially into sliding contact with the walls forming the opening through the respective connecting portion.

5. A valve as defined in claim 1 wherein said valve member is a gate valve member.

References Cited

UNITED STATES PATENTS

| 2,970,805 | 2/1961 | Pool | 251—317 X |
| 2,857,129 | 10/1958 | Overholser et al. | 251—172 |
| 3,047,265 | 7/1962 | Kaiser | 251—172 |
| 3,266,769 | 8/1966 | Shand | 251—172 |

FOREIGN PATENTS

| 571,285 | 8/1945 | Great Britain. |

ARNOLD ROSENTHAL, *Primary Examiner.*

U.S. Cl. X.R.
251—315, 328